Patented Sept. 8, 1931

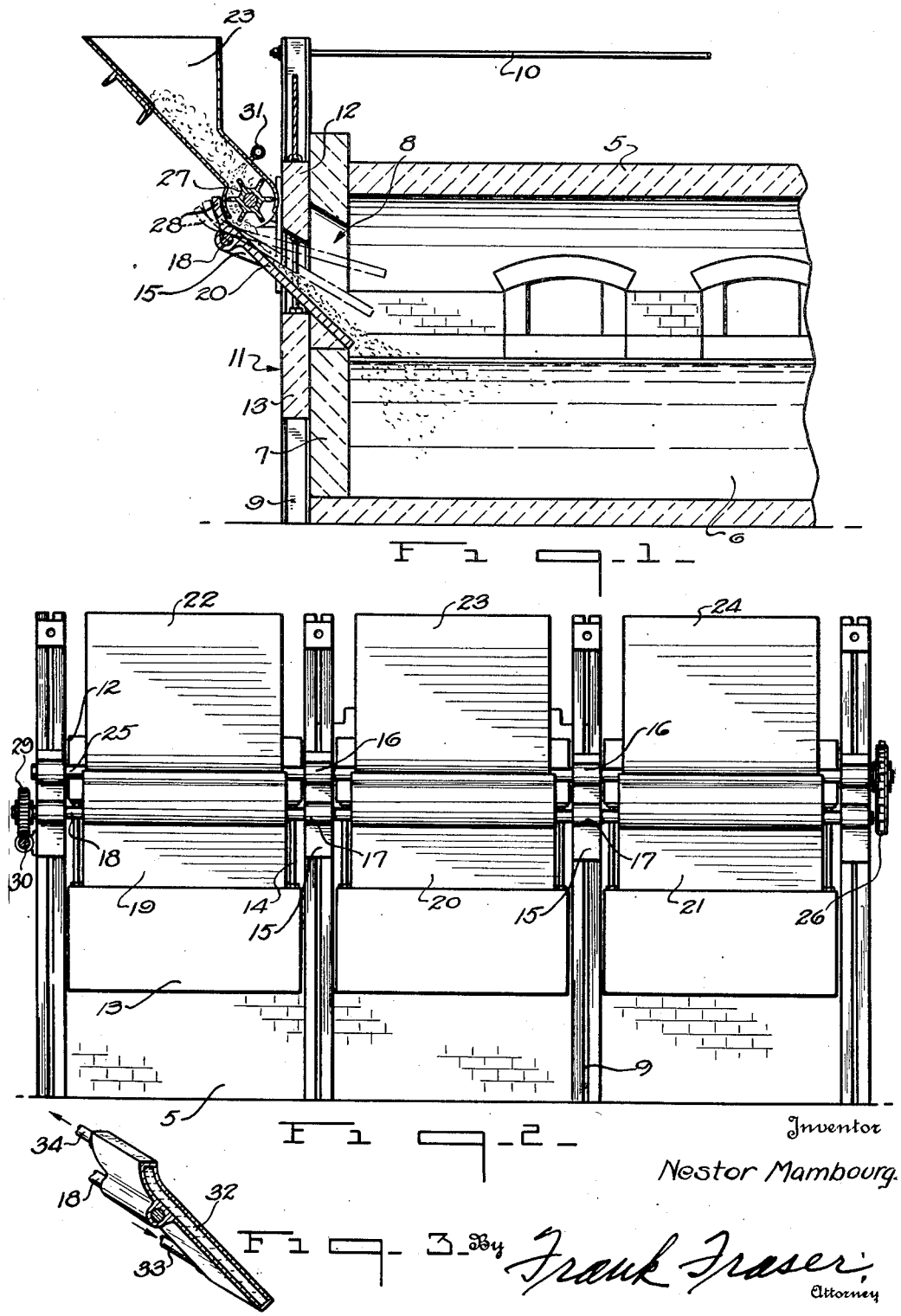

1,822,705

UNITED STATES PATENT OFFICE

NESTOR MAMBOURG, OF LANCASTER, OHIO, ASSIGNOR TO LIBBEY-OWENS-FORD GLASS COMPANY, OF TOLEDO, OHIO, A CORPORATION OF OHIO

MEANS FOR INTRODUCING BATCH INGREDIENTS INTO GLASS MELTING FURNACES

Application filed September 14, 1928. Serial No. 305,888.

The present invention relates to an improved method of and means for introducing or feeding raw glass batch ingredients into a melting furnace.

The principal object of the invention is the provision of a novel method of and means for feeding the raw glass batch ingredients into the furnace in such a manner that the said ingredients may become more quickly and thoroughly fused and amalgamated than heretofore and whereby the resultant molten glass will be more homogeneous and the danger of unmelted particles of batch passing through the furnace to the point of removal minimized, to the end that a saving in time may result from the rapid and thorough fusion of the glass making materials and an improvement in the quality of the article manufactured may be had due to the more perfect homogeneity of the glass.

Generally speaking, the above objects are accomplished by effecting a more even and uniform distribution of the glass batch ingredients or glass making materials into the furnace throughout substantially the entire width thereof, the batch being preferably broken up and scattered or sprinkled upon the molten glass already within the furnace instead of being dumped thereupon in a large relatively solid mass or pile. In addition to accelerating the rapid and thorough fusion of the glass making materials and in rendering the glass more homogeneous and preventing unmelted batch particles from passing through the furnace, the disturbance to the molten glass already within the tank will be greatly reduced. All of these advantages tend toward the formation of a higher quality sheet or other glass article being produced.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through a portion of the receiving or melting end of a glass melting furnace and the improved batch feeding means associated therewith.

Fig. 2 is an end elevation thereof, and

Fig. 3 is a detail section through a modified type of batch delivery plate member.

Referring to the drawings, the numeral 5 designates the receiving or melting end of a glass melting furnace, preferably though not necessarily of the continuous tank type, and within which is adapted to be produced the mass or body of molten glass 6. The rear vertical wall 7 of the furnace is provided with an opening 8 extending substantially the entire width thereof. A plurality of spaced vertical buckstays 9, having associated therewith rods 10, are provided to assist in tying the furnace structure together. Positioned between each pair of adjacent buckstays is a vertically adjustable gate designated in its entirety by the numeral 11 and comprising more specifically and upper section 12 and a lower section 13 spaced from said upper section but connected thereto by rods 14.

Carried by each buckstay 9 is a bracket member 15 having upper and lower bearing portions 16 and 17, with the bearing portions of the several brackets arranged in horizontal alignment with one another. Journaled within the lower bearing portions 17 of brackets 15 is a shaft 18 and keyed to said shaft between the adjacent buckstays are the three inclined substantially flat plate members 19, 20 and 21 which are adapted to receive the glass batch ingredients and deliver them into the furnace. The plate members 19, 20 and 21 are arranged side by side and project through the gates 11 and slightly into the furnace through the opening 8 in the rear wall 7 so that the ingredients will be introduced into said furnace throughout substantially the entire width thereof. While only three plate members have been illustrated and described, a more or less number may be used depending upon the width of the furnace and the number of buckstays associated with the end wall 7 thereof.

Mounted above the plate members 19, 20 and 21 are the hoppers or feeders 22, 23 and 24 respectively, said hoppers being adapted to initially receive the glass batch ingredients and deliver them onto the upper ends of the respective plate members 19, 20 and 21, each hopper being provided with an outlet opening in its bottom. Extending through the lower ends of the hoppers and journaled within the upper bearing portions 16 of brackets 15 is a shaft 25 driven in any suitable manner such as through a chain and sprocket connection or the like 26. Fixed upon the shaft 25 within each hopper is a rotatable batch feed control member 27. The members 27 are rotated in unison upon rotation of shaft 25 and the speed at which the members are rotated controls the rate at which the batch is fed into the furnace. The upper ends of the plate members are curved slightly upwardly as indicated at 28 to prevent the batch from falling off of the rear ends thereof.

In practice, the glass batch ingredients or glass making materials are adapted to be initially supplied to each of the hoppers or feeders 22, 23 and 24. Upon rotation of the feed control members 27 arranged therein, the batch will be fed downwardly from the hoppers onto the inclined plate members 19, 20 and 21. The batch sliding down these plate members enters the furnace through the opening 8. By feeding the batch to the several hoppers simultaneously, the said batch will be more evenly and uniformly distributed across substantially the entire width of the furnace. The rotatable batch feed control members 27 function to break up the batch so that the same will be scattered or sprinkled upon the surface of the body of molten glass 6 within the furnace. By introducing the batch in this manner, it will be apparent that the same will be more rapidly and thoroughly fused than if it were dumped into the furnace in a relatively large solid mass or pile. Consequently, the resultant molten glass should be of improved homogeneity and the passage of unmelted batch particles through the furnace to the point of removal minimized. Moreover, by supplying the batch ingredients to the furnace in this manner the disturbance occasioned to the molten glass within the furnace will be reduced.

The plate members 19, 20 and 21 are also preferably adjustable so that their angles of inclination may be varied as desired so as to change the point at which the batch falls into the furnace and further to vary the amount of fall or drop of the batch thereinto. For instance, when the plate members are lowered to the full line position in Fig. 1, the batch ingredients will slide down into the furnace and be deposited upon the molten glass therein closely adjacent the rear end wall 7 with very little fall or drop. However, as the plate members are raised as indicated by the broken lines, the distance between the rear wall of the furnace and the point at which the batch enters the same is gradually increased as is also the drop or fall thereof. The adjusting of the plate members 19, 20 and 21 may be effected by keying to one end of the shaft 18 a worm gear 29 and driving the same from a worm shaft 30. Thus, upon rotation of the shaft 30, the inner ends of the plate members may be raised or lowered as preferred.

In order to prevent particles of the batch from blowing around within the furnace as the batch is introduced thereinto, means 31 may be provided for directing a spray of water or other liquid upon the batch as it passes through the hoppers. By dampening or wetting the batch in this manner, there is less tendency for the batch particles to blow around within the furnace.

In Fig. 3 is illustrated a slightly modified type of plate member designated 32. This member is preferably constructed of metal and is hollow so that a suitable temperature control medium such as water may be circulated therethrough. The water is adapted to enter the interior of the plate member through the pipe 33 and to exit therefrom through the pipe 34. It may be desirable to construct the plate members in this manner, since the heat to which they will be subjected will be considerable.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for introducing raw batch into a glass melting furnace, an inclined plate member for receiving the batch and feeding it into said furnace, and means for adjusting the angle of inclination of said plate member to vary the point of entry of the batch into the furnace and for also varying the amount of fall of said batch thereinto.

2. In apparatus for introducing raw batch into a glass melting furnace, a plurality of members arranged side by side transversely of the furnace for receiving the batch and feeding it into said furnace throughout substantially the entire width thereof, and means for adjusting the angles of inclination of said members to vary the point of entry of the batch into the furnace and for also varying the amount of fall of said batch thereinto.

3. The combination with a glass melting furnace having an opening in its rear vertical wall extending substantially the entire width thereof, and a plurality of spaced vertical buckstays engaging the vertical wall to assist in tying the furnace structure together, of a plurality of inclined plate members carried by the buckstays and arranged between the same and projecting slightly into the furnace through said opening, said members being adapted to receive the batch and feed it into the furnace throughout substantially the entire width thereof, and an adjustable gate associated with each opening and through which said members also project.

4. The combination with a glass melting furnace having an opening in its rear vertical wall extending substantially the entire width thereof, and a plurality of spaced vertical buckstays engaging the vertical wall to assist in tying the furnace structure together, of a plurality of inclined plate members carried by the buckstays and arranged between the same and projecting slightly into the furnace through said opening, said members being adapted to receive the batch and feed it into the furnace throughout substantially the entire width thereof, an adjustable gate associated with each opening and through which said members also project, a hopper associated with each member for initially receiving the batch and delivering it thereto, and a rotatable batch feed control member within each hopper.

5. The combination with a glass melting furnace having an opening in its rear vertical wall extending substantially the entire width thereof, of a plurality of inclined plate members arranged side by side for receiving the glass batch thereupon and delivering it through said opening into the furnace throughout substantially the entire width thereof, and an adjustable gate associated with each plate member.

6. The combination with a glass melting furnace having an opening in its rear vertical wall extending substantially the entire width thereof, of a plurality of inclined plate members arranged side by side and projecting slightly into the furnace through said opening, said members being adapted to receive the batch and feed it into the furnace throughout substantially the entire width thereof, and an adjustable gate associated with each plate member and through which said member projects.

Signed at Lancaster, in the county of Fairfield and State of Ohio, this tenth day of September, 1928.

NESTOR MAMBOURG.